United States Patent [19]
Mari-Roca et al.

[11] Patent Number: 5,390,085
[45] Date of Patent: Feb. 14, 1995

[54] LIGHT DIFFUSER FOR A LIQUID CRYSTAL DISPLAY

[75] Inventors: Gerardo M. Mari-Roca, Boynton Beach; Lori Vaughn, Lake Worth; Jeffrey S. King, Boynton Beach, all of Fla.; Kevin W. Jelley, LaGrange Park, Ill.; Alan G. Chen, Schaumburg, Ill.; George T. Valliath, Buffalo Grove, Ill.

[73] Assignee: Motorola, Inc., Schaumburg, Ill.

[21] Appl. No.: 155,070

[22] Filed: Nov. 19, 1993

[51] Int. Cl.6 .......................... F21V 7/04; F21V 7/22
[52] U.S. Cl. ........................................ 362/31; 362/26; 362/276; 362/339; 362/802
[58] Field of Search .................... 362/26, 31, 339, 276, 362/802

[56] References Cited

U.S. PATENT DOCUMENTS

| | | | |
|---|---|---|---|
| 4,218,726 | 8/1980 | Fukasawa et al. | 362/31 |
| 4,277,817 | 7/1981 | Hehr . | |
| 4,528,617 | 7/1985 | Blackington . | |
| 4,706,173 | 11/1987 | Hamada et al. . | |
| 4,890,201 | 12/1989 | Toft . | |
| 4,994,941 | 2/1991 | Wen | 362/31 |
| 5,050,946 | 9/1991 | Hathaway et al. . | |
| 5,070,431 | 12/1991 | Kitazawa et al. | 362/26 |
| 5,136,480 | 8/1992 | Pristash et al. | 362/31 |
| 5,255,162 | 10/1993 | Kawamoto | 362/339 |
| 5,283,673 | 2/1994 | Murase et al. | 362/31 |

OTHER PUBLICATIONS

Blumenfeld and Jones, *Parts That Glow: Design Techniques for Controlling Light in Illuminated Acrylic Plastic Parts*, Machine Design, Oct. 29, 1959, pp.94–108.

Primary Examiner—Ira S. Lazarus
Assistant Examiner—L. Heyman
Attorney, Agent, or Firm—Philip P. Macnak; John H. Moore

[57] ABSTRACT

A light diffuser (100) for illuminating a display (304) comprises a rectangular light distributor (108) which is coupled to a light director (208) located along an edge normal to a major axis (110) of the light distributor (108). The light director (208) directs light received from a lamp (14) into the light distributor (108). The light distributor (108) has a polished, planar top surface (210) and a bottom surface (112) comprising a predetermined serration pattern oriented normal to the major axis (110) of the rectangular light distributor (108). The predetermined serration pattern comprises a plurality of grooves (116, 118, 120) having a predetermined pitch gradient corresponding thereto. The plurality of grooves (116, 118, 120) further have roughened surfaces for diffusing light impinging thereon toward the polished, planar top surface (210) of the light distributor (108). The light impinging on the polished, planar top surface (210) at less than a critical angle is coupled through the polished, planar top surface (210) to uniformly illuminate the display (304).

20 Claims, 5 Drawing Sheets

LIGHT DIFFUSER FOR A LIQUID CRYSTAL DISPLAY

BACKGROUND OF THE INVENTION

1. Field of the Invention

The present invention relates generally to the field of display backlight diffusers, and more particularly to an enhanced light diffuser for a liquid crystal display.

2. Description of the Prior Art

Liquid crystal displays have become very popular for use in many products ranging from hand held calculators and watches to communication receivers, due largely to their very low power drive requirements. However, there is a significant drawback when liquid crystal displays are used, in that there must be a source of light, such as sunlight or room light, which is required to illuminate the display to make the displayed information readable. When sunlight or room light is unavailable, such as in the evening, at night, or in a darkened room, the displayed messages become unreadable except with the aid of auxiliary lighting. Such auxiliary lighting has generally been provided by a lamp mounted in front of, adjacent to, or behind the display to provide the light necessary to read the message. When a lamp is provided which is positioned adjacent to the display, the lighting provided has generally been non-uniform, with a "hot", or brightly lit, spot being located on the display near the lamp, and a darkly lit area being located on the display away from the light, both conditions often detracting from the readability of the display. Numerous methods have been employed to overcome the problem of poor light distribution across the display, the most commonly employed being that of using a light diffuser, or wedge in an attempt to provide a more uniform distribution of the auxiliary light across the display to make the message readable in dim lighting situations. The prior art light diffusers have relied on a number of techniques in order to achieve light distribution across a display. One technique which has been employed is the use of a transparent plastic material having a roughened top surface and a reflective back surface, often backed by an opaque reflective tape, the combination of which is intended to improve the distribution of light toward the display. While providing improvement in the light distribution, the "hot" spots have generally remained, as well as a generally non-uniform light distribution across the display. Light wedges, wherein the thickness of the plastic material is reduced across the length of the display, have been used to further enhance the uniformity of the light distribution across the display. Again, while providing improvement in the light distribution, the "hot" spots have generally remained, as well as a noticeable non-uniform light distribution across the display. Other techniques, such as employing multiple auxiliary lamps located at opposite ends of the light wedge, have improved the lighting uniformity, but at a cost of additional power to drive a second auxiliary light source as well as the cost of a second lamp. Still another technique used to provide back lighting for a liquid crystal display, especially a large display has been through the use of a electroluminescent panel which, while providing generally uniform illumination, and which while providing a more uniform illumination, is achieved at a significant cost increase as well as a significant increase in the power required to drive the electroluminescent panel.

What is needed is a light diffuser which utilizes a single light source, and which enhances the distribution of light to more uniformly illuminate a display.

SUMMARY OF THE INVENTION

In accordance with one aspect of the present invention, a light diffuser for illuminating a display comprises a rectangular light distributor, coupled to a light director located along an edge normal to a major axis of the light distributor. The light director directs light received from a lamp into the light distributor. The light distributor has a polished, planar top surface and a bottom surface comprising a predetermined serration pattern oriented normal to the major axis of the rectangular light distributor. The predetermined serration pattern comprises a plurality of grooves having a predetermined pitch gradient corresponding thereto. The plurality of grooves further has roughened surfaces for diffusing light impinging thereon toward the polished, planar top surface. The light impinging on the polished, planar top surface at less than a critical angle from the roughened surfaces of the grooves is coupled through the polished, planar top surface of the rectangular light distributor to uniformly illuminate the display.

In accordance with a second aspect of the present invention, a system for back lighting a liquid crystal display, comprises a lamp for generating light, and a light director optically coupled to the lamp. The light director is further coupled to a light distributor at an edge normal to a major axis thereof, for directing the light received from the lamp into the light distributor. The light distributor comprises a transparent material and has a polished, top surface and a bottom surface comprising a predetermined serration pattern oriented normal to the major axis of the light distributor. The predetermined serration pattern comprises a plurality of grooves having a predetermined pitch gradient corresponding thereto. The plurality of grooves further has roughened surfaces for diffusing light impinging thereon toward the polished, planar top surface. The light impinging on the polished, planar top surface at less than a critical angle from the roughened surfaces of the grooves is coupled through the polished, planar top surface of the light distributor to uniformly illuminate the liquid crystal display.

In accordance with a third aspect of the present invention a communication receiver comprises a receiver for receiving message information including an address; a decoder coupled to the receiver for decoding the address to detect message information directed to the communication receiver; a display for displaying information including the received message information; a controller responsive to the decoder and coupled to the display for controlling the display of the information including the message information; and a back lighting system responsive to information being displayed on the display. The back lighting system comprises a lamp responsive to the controller for generating light for illumination; a light director optically coupled to the lamp and further coupled to a light distributor at an edge normal to a major axis thereof for directing the light received from the lamp into the light distributor. The light distributor comprises a transparent material having a polished, planar top surface and a bottom surface comprising a predetermined serration pattern oriented normal to the major axis of the light distributor. The predetermined serration pattern comprises a plurality of grooves having a predetermined pitch gradient, and have roughened surfaces for diffusing light impinging on the roughened surfaces toward the polished, planar top surface. Light impinging on the polished, planar top surface at less than a critical angle from the roughened surfaces of the grooves is coupled through the top planar surface to substantially uniformly illuminate the information including the message information being displayed on the display.

DESCRIPTION OF THE PREFERRED EMBODIMENTS

Figure 1:
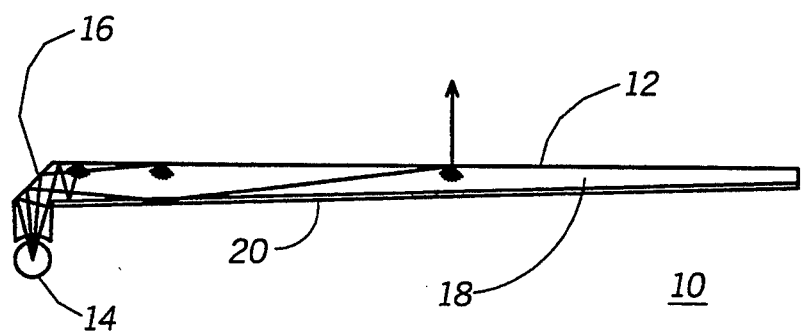
FIG. 1 is a pictorial diagram of a prior art light diffuser.

FIG. 1 is a pictorial diagram of a prior art light diffuser 10. The light diffuser 10 has an top planar surface 12 which couples light to a liquid crystal display. The top planar surface is generally roughened, although a polished surface has been used as well. A lamp 14 provides light which is directed into the diffuser by a polished surface 16, typically set at a 45° angle. Light entering the length of the light diffuser may be directed to the bottom planar surface 18, as shown, at which point the light is reflected to the top planar surface 12. An opaque reflective material, such as a white tape, was often used to improve the reflectance of the light impinging on the bottom planar surface 18. Some of the rays of light are also directly directed toward the top planar surface 12. When the light impinges on the top planar surface at less than the critical angle of 39.1° for a material such as a polycarbonate plastic, the light is coupled through the surface to the liquid crystal display positioned above.

As previously described above, the prior art light diffuser 10 did not uniformly distribute light along the length of the diffuser body. Some of the light which impinged on reflective surface 16 was reflected back toward the lamp, thereby reducing the light which is available to illuminate the display. Likewise, some of the light which impinged on the roughened, top planar surface 12 was redirected back toward the lamp, again reducing the light which is available to illuminate the display. This loss of available light results in a reduction in the light available to illuminate the liquid crystal display.

Figure 2:
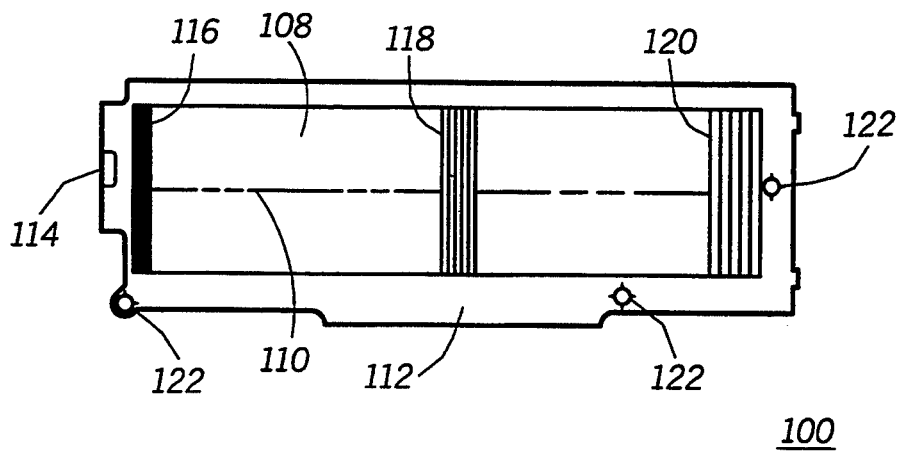
FIG. 2 is a pictorial diagram of the bottom surface of the light diffuser in accordance with a preferred embodiment of the present invention.

FIG. 2 is a pictorial diagram of the bottom surface 112 of the light diffuser 100 in accordance with a preferred embodiment of the present invention. The rectangular area represents a light distributor 108 area which couples light into the display, as will be described in further detail below. Located at one edge of the light distributor 108 area at an edge of the bottom surface 112 is a light collector 114, which includes a polished surface for collecting light generated by a lamp. The light collected by the light collector 114 is directed into the body of the light distributor 108 area wherein the light impinges on a predetermined serration pattern, illustrated as linear grooves 116, 118 and 120 oriented normal to the major axis 110 of the light distributor 108 area. The linear grooves vary in pitch, i.e. the spacing between grooves, and depth (pitch gradient) from the proximal end of the light distributor 108 area nearest the lamp, as represented by the linear grooves 116, to the distal end furthest from the lamp, as represented by linear grooves 120. The pitch gradient of the linear grooves, in a first embodiment of the present invention, is the same for a predetermined group of grooves, such as represented by the linear groove groupings 116, 118 and 120. In a second aspect of the present invention, the pitch gradient of the linear grooves varies continuously between the proximal and distal ends of the light distributor 108 area, as will be explained further below.

Figures 3A, 3B, 3C:
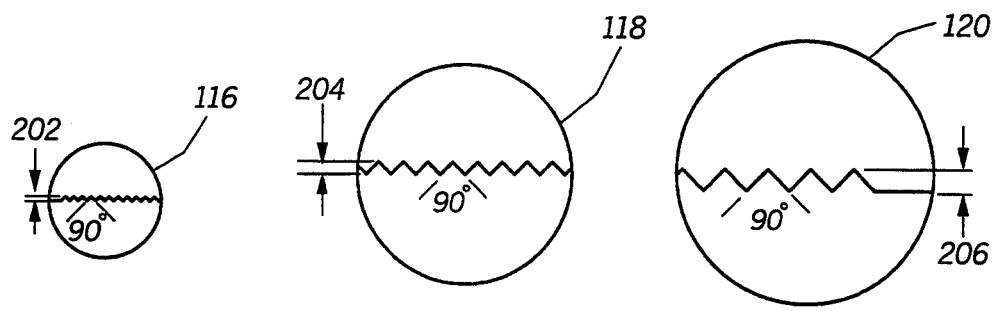
FIGS. 3A, 3B and 3C are exploded views of the predetermined serration pattern disposed along the major axis of the light diffuser in accordance with the preferred embodiment of the present invention.
Figure 3:
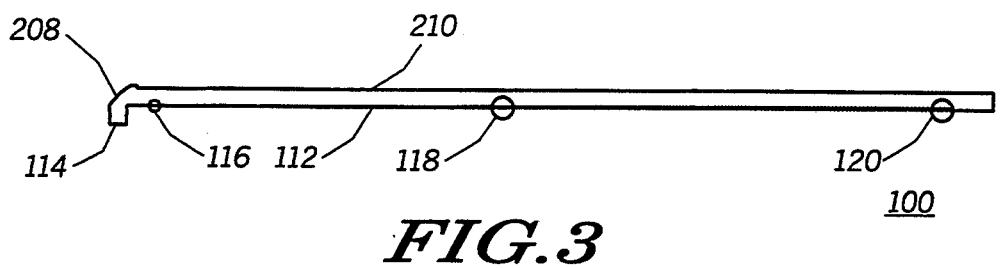
FIG. 3 is a sectional view along the major axis of the light diffuser in accordance with a preferred embodiment of the present invention.

FIG. 3 is a sectional view along the major axis of the light diffuser 100 in accordance with a preferred embodiment of the present invention. As shown, the light diffuser 100 comprises a light director which includes the light collector 114 which collects light generated by the lamp, and a faceted reflecting element 208, to be described in further detail below. The top planar surface 210 of the light diffuser 100 is polished, to reflect those light rays which exceed the critical angle back toward the bottom surface 112. The bottom surface 112 comprises a predetermined serration pattern 116, 118 and 120, shown as exploded views 116, 118 and 120 in FIGS. 3A, 3B and 3C, respectively. In the preferred embodiment of the present invention, the predetermined serration pattern 116, 118 and 120 are grooves which have a triangular cross-section, wherein the sides of the triangular section are at 90° as shown. The pitch gradient varies from the proximal end to the distal end of the light distributor 108 area. In the preferred embodiment of the present invention, at the proximal end of the light distributor 108 area, the serration pattern 116 has a pitch, or spacing between ridges, of 0.0017 inches (0.0043 mm) and a depth 202 of 0.0015 inches (0.04 mm). At the distal end of the light distribution 108 area, the serration pattern 120 has a pitch of 0.0069 inches (0.175 mm) and a depth 208 of 0.006 inches (0.15 mm). The pitch gradient can vary continuously from one end to the other within the light distributor 108 area, or can be varied in a sequence of predetermined groupings of grooves, as shown in FIG. 2. It will be appreciated that the depth 204 within the serration pattern 118 is dependent upon whether the pitch gradient varies continuously between the proximal end and the distal end of the light distribution 108 area. In the preferred embodiment of the present invention, the thickness of the light diffuser is substantially uniform, as the peaks of the grooves lie in substantially the same plane as the bottom planar surface 112.

The surfaces of the grooves are roughened in the preferred embodiment of the present invention, unlike that of prior art light diffusers in which the groove surfaces were generally polished. In the preferred embodiment of the present invention, the surfaces of the grooves are roughened using a chemical etching process, such as developed by Rawal Engravers, a Division of Mold-Tech of Villa Park, Ill. While it will be appreciated that other processes for roughening the surfaces of the grooves are available, most other processes result in significant deformation of the grooves, especially those of minimum pitch gradient.

Figure 4:
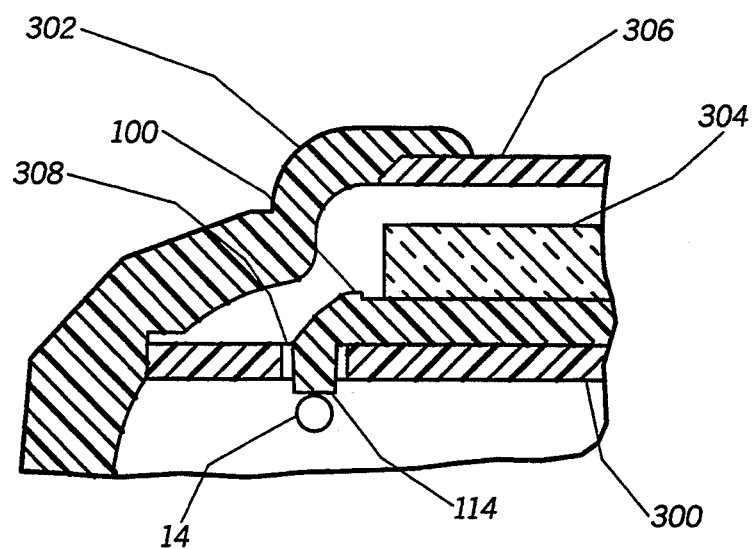
FIG. 4 is a sectional view of a liquid crystal display mounted in a housing with the light diffuser in accordance with a preferred embodiment of the present invention.

FIG. 4 is a sectional view of a liquid crystal display 304 mounted in a housing 302 with the light diffuser 100 in accordance with a preferred embodiment of the present invention. As shown, the light diffuser 100 is mounted on a printed circuit board 300 and is secured using crushable posts 122 shown in FIG. 2. It will be appreciated that other methods of securing the light diffuser to the printed circuit board can be utilized as well. A portion of the light director passes through the printed circuit board 300 via a hole 308, thereby allowing the lamp 14 to be positioned on the circuit board on the side opposite that of the light diffuser 100. In the preferred embodiment of the present invention the lamp 14 is a tubular lamp, although it will be appreciated that other lamp geometry's can be used as well. A liquid crystal display 304 is positioned above the light diffuser 100. The liquid crystal display 304 is used to display information such as that which is received by a communication receiver, as will be described below. The display assembly is secured into the housing 302 which also includes an opening into which a clear plastic window 306 is secured. The clear plastic window 306 protects the liquid crystal display 304 from being scratched as well as to provide protection from other environmental factors, such as moisture, dust, etc.

Figure 5:
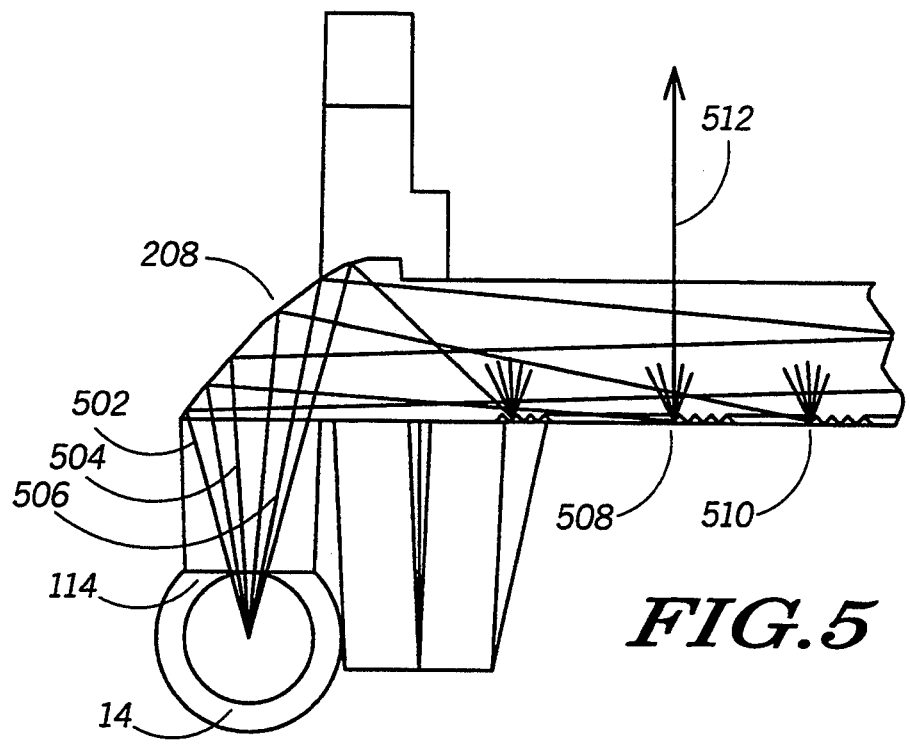
FIG. 5 illustrates light ray tracings through the light diffuser in accordance with a preferred embodiment of the present invention.

FIG. 5 illustrates light ray tracings through the light diffuser 100 in accordance with a preferred embodiment of the present invention. Light generated by the lamp 14 is collected by the light collector 114, and is shown schematically as three light rays 502, 504 and 506 which impinge on the faceted directing element 208. The surface of the faceted directing element 208 is polished to reflect the light rays impinging thereon. Unlike prior art light diffusers which typically provided a light director angled at 45° to the light collector 114, the surface of the faceted light director 208 is composed of a number of facets, each of which is angled to optimally direct light into the light distributor 108 (FIG. 2) area. Such directing of the light rays insures that substantially none of the light rays are reflected back toward the lamp, as occurs in many prior art designs, and further insures that the primary light rays are directed to different portions of the light distributor 108 area. As the primary light rays impinge on the roughened edges of the grooves on the bottom surface of the light diffuser, the light represented by rays 508, 510 are diffused, or scattered, with some of the light represented by ray 512 being coupled to the display 304 (FIG. 4), while other light rays are directed toward and away from the light source. When the secondary rays impinge on the front planar surface 210 (FIG. 3), those which impinge at an angle greater than the critical angle are reflected, while those which impinge at less than the critical angle are coupled into the display. The reflected secondary light rays upon impinging on the roughened surface of the grooves result in additional secondary rays which are again scattered in all directions depending upon which surface of the groove the secondary rays impinge upon. The roughened surfaces of the grooves act to provide a near-isotropic light output, which is uniform across the length of the display by more efficiently distributing the light rays throughout the light distributor 108 area. The luminescence intensity measured at the distal end of the light distributor 108 area (FIG. 2), in the preferred embodiment of the present invention, was measured to be seven times as great as that of the prior art light wedge such as described in FIG. 1, and showed exceptional uniformity across the light director 108 area. It will be appreciated, that the results obtained were without the use of a reflective tape or other reflective surface, such as is generally used in the prior art.

Figure 6:
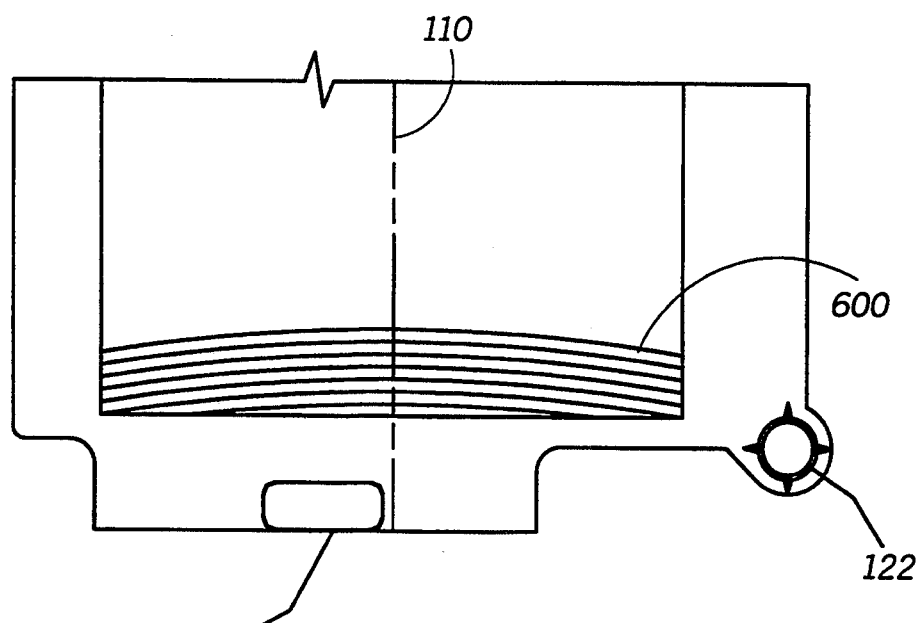
FIG. 6 is a pictorial view of a portion of the bottom surface of the light diffuser in accordance with an alternate embodiment of the present invention.

FIG. 6 is a pictorial view of a portion of the bottom surface of the light diffuser in accordance with an alternate embodiment of the present invention. As shown in FIG. 6, the serration pattern 600 comprises a plurality of arctuate grooves oriented normal to and bisected by the major axis 110 of the light distributor 108 area (FIG. 2). The radius of the arctuate grooves is preferably from 3.5 to 4.0 inches (88.9 to 101.6 mm), although it will be appreciated that other radiuses can be used with larger or smaller light diffuser geometry's. The serration pattern 600 provides additional advantage by directing the light to the corners and edges of the light distributor 108 area (FIG. 2).

Figure 7:
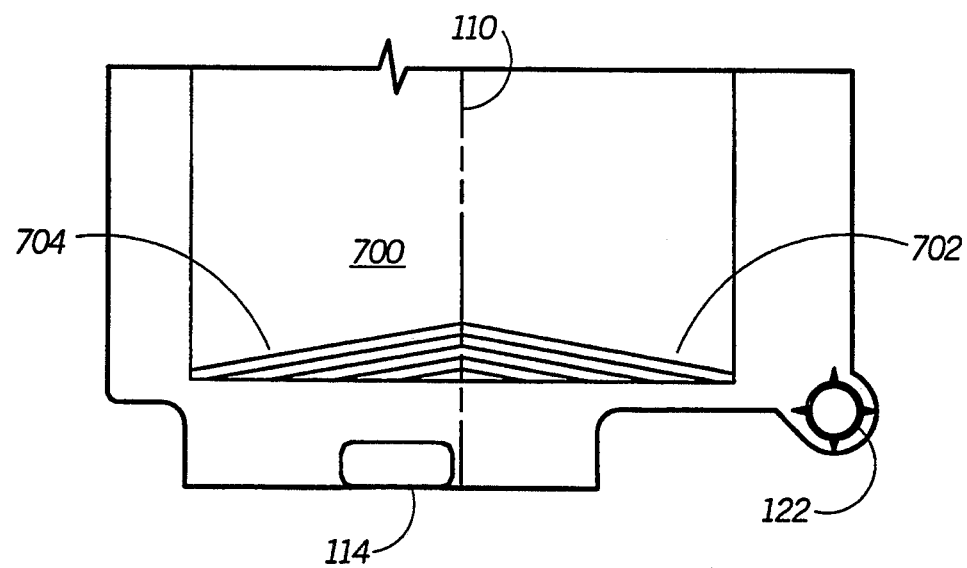
FIG. 7 is a pictorial view of a portion of the bottom surface of the light diffuser in accordance with yet another alternate embodiment of the present invention.

FIG. 7 is a pictorial view of a portion of the bottom surface of the light diffuser in accordance with yet another alternate embodiment of the present invention. As shown in FIG. 7, the serration pattern 700 comprises a plurality of paired linear grooves 702, 704 oriented at an angle opposite to and bisected by the major axis 110 of the light distributor 108 area (FIG. 2). The angle is exaggerated for the sake of clarity, and is preferably from 1° to 10° relative to the normal to the major axis 110, although it will be appreciated that other angles would be suitable for use with larger or smaller light diffuser geometry's. The serration pattern 700 provides additional advantage by directing the light to the corners and edges of the light distributor 108 area (FIG. 2), as well as to the center of the display area.

Figure 8:
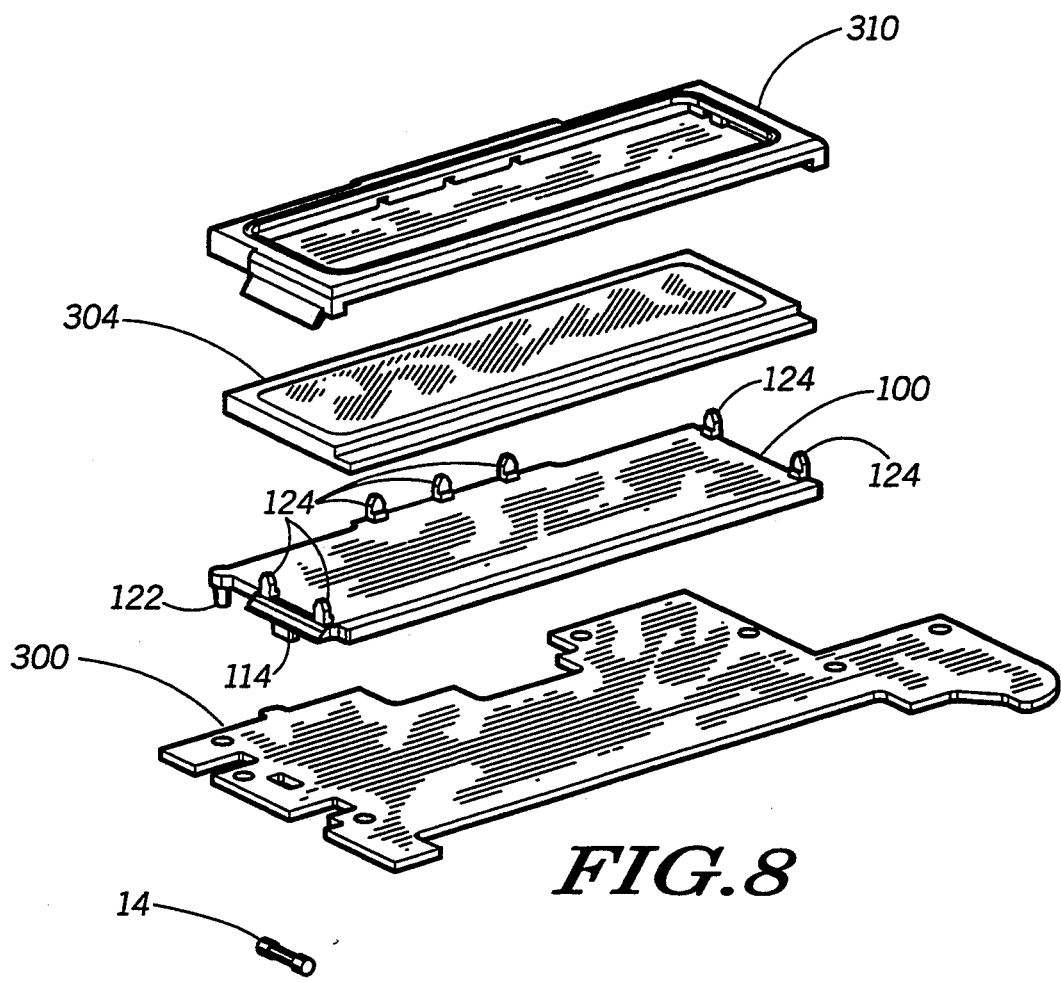
FIG. 8 is an exploded view of the assembly of a system for illuminating a liquid crystal display in accordance with the preferred embodiment of the present invention.

FIG. 8 is an exploded view of the assembly of a system for illuminating a liquid crystal display in accordance with the preferred embodiment of the present invention. A printed circuit board 300 is provided to which are attached those components necessary to drive the liquid crystal display, as well as any other components which are required to implement an electronic device, such as a communication receiver, to be described below. The components, as well as the tubular lamp 14 are attached to the printed circuit board 300 using any of a number of well known component attachment techniques, such as reflow soldering. The light diffuser 100 is positioned on the printed circuit board 300, and physically retained in position using any of a number of well known techniques, such as the crush tabs 122 molded contiguously with the light diffuser 100. The liquid crystal display is positioned over the light diffuser, and retained in position using any of a number of well known techniques, such as positioning tabs 124 which are also molded contiguously with the light diffuser 100. Connection between the printed circuit board 300 and the liquid crystal display 304 is accomplished using any of a number of well known techniques, such as a flexible circuit (not shown), or an elastomeric connector (also not shown). A bezel 310 secures the assembly together, and in the case of when an elastomeric connector is utilized, the bezel 310 insures a uniform compression is maintained on the connector to provide proper electrical connection between the printed circuit board and the liquid crystal display.

Figure 9:
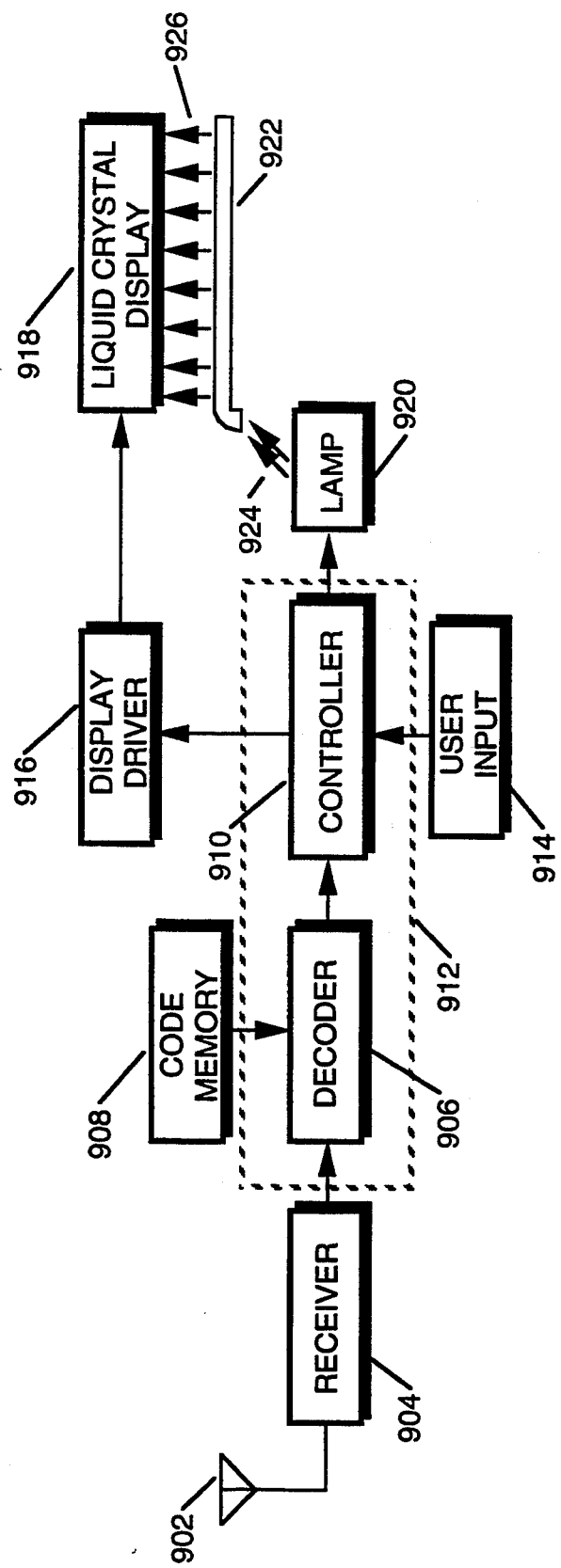
FIG. 9 is an electrical block diagram of a communication receiver utilizing the system for illuminating a liquid crystal display in accordance with the preferred embodiment of the present invention.

FIG. 9 is an electrical block diagram of a communication receiver utilizing the system for illuminating a liquid crystal display in accordance with the preferred embodiment of the present invention. An antenna 902 is provided which intercepts message information transmitted in any of a number of well known signaling protocols, such as the POCSAG (Post Office Code Standardization Advisory Group) signaling protocol or the Golay Sequential Code (GSC) signaling protocol. The message information intercepted by the antenna 902 is coupled to the input of a receiver 904 which processes the received message information in a manner well known in the art, and providing at the output a stream of information representative of the message transmitted. The stream of message information, which includes address and message information is coupled to a decoder 906 which processes the address information. When the address information matches address information stored in a code memory 908, the decoder 906 generates an output enabling the processing of the following message information. A controller 910 processes the message information in a manner well known in the art, such as by storing the message information in a memory (not shown). It will be appreciated that the functions of the decoder 906 and the controller 910 can be performed by a single device, such as a microcomputer 912. The stored message information can be recalled by the communication receiver user through a user input 914 which includes a number of switches. When a message is recalled from memory, the message is provided to a display driver 916 which formats the message information for display on a display 918, such as a liquid crystal display. When a message is being displayed, and the light level is low, a lamp 920 can be activated, either by the user or automatically. The light 924 generated by the lamp 920 is directed through the light diffuser 922 in a manner as previously described above, producing a uniform light output 926 to illuminate the display 918.

In summary a light diffuser for a liquid crystal display has been described above which provides an enhanced illumination for a liquid crystal display. The light diffuser comprises a rectangular light distributor, coupled to a light director located along an edge normal to a major axis of the light distributor. The light director directs light received from a lamp into the light distributor. The light distributor has a polished, planar top surface and a bottom surface comprising a predetermined serration pattern oriented normal to the major axis of the rectangular light distributor. The predetermined serration pattern comprises a plurality of grooves having a predetermined pitch gradient corresponding thereto. The plurality of grooves further have roughened surfaces for diffusing light impinging thereon toward the polished, planar top surface. The light impinging on the polished, planar top surface at less than a critical angle from the roughened surfaces of the grooves is coupled through the polished, planar top surface of the rectangular light distributor to uniformly illuminate the liquid crystal display.

We claim:

1. A light diffuser for illuminating a display comprising:

a rectangular light distributor, coupled to a light director located along an edge normal to a major axis of said light distributor, said light director for directing light received from a lamp into said light distributor;

said light distributor having a polished, planar top surface, and a bottom surface comprising a predetermined serration pattern oriented normal to said major axis of said rectangular light distributor;

said predetermined serration pattern comprising a plurality of grooves having a predetermined pitch gradient corresponding thereto;

said plurality of grooves further having roughened surfaces for diffusing light impinging thereon toward said polished, planar top surface; and whereby the light impinging on said polished, planar top surface at less than a critical angle from said roughened surfaces of said grooves is coupled there through to uniformly illuminate the display.

2. The light diffuser according to claim 1, wherein said rectangular light distributor comprises a transparent material.

3. The light diffuser according to claim 1, wherein said rectangular light distributor has a substantially uniform thickness.

4. The light diffuser according to claim 1, wherein said serration pattern comprises a plurality of linear grooves oriented normal to said major axis of said rectangular light distributor.

5. The light diffuser according to claim 1, wherein said serration pattern comprises a plurality of paired linear grooves oriented at an angle opposite to and bisected by said major axis of said rectangular light distributor.

6. The light diffuser according to claim 1, wherein said serration pattern comprises a plurality of arctuate grooves oriented normal to and bisected by said major axis of said rectangular light distributor.

7. The light diffuser according to claim 1, wherein said pitch gradient increasingly varies a depth of said plurality of grooves continuously from the point proximal to said light collector to the point distal to said light collector.

8. The light diffuser according to claim 1, wherein said pitch gradient varies a depth of said plurality of grooves in a predetermined groups of said grooves from a point proximal to said light collector to a point distal to said light collector.

9. The light diffuser according to claim 1, wherein said light director comprises:

a light collector, positioned below said bottom surface of said light distributor, for collecting the light generated by said lamp; and a faceted reflecting element for reflecting substantially all of the collected light into said light distributor.

10. A system for back lighting a liquid crystal display, comprising:

a lamp for generating light; and a light director, optically coupled to said lamp, and further coupled to a light distributor at an edge normal to a major axis thereof, for directing the light received from said lamp into said light distributor, and said light distributor comprising a transparent material and having a polished, top surface, and a bottom surface comprising a predetermined serration pattern oriented normal to said major axis of said light distributor, said predetermined serration pattern comprising a plurality of grooves having a predetermined pitch gradient corresponding thereto, said plurality of grooves further having roughened surfaces for diffusing light impinging thereon toward said polished, planar top surface, and whereby the light impinging on said polished, planar top surface at less than a critical angle from said roughened surfaces of said grooves is coupled there through to substantially uniformly illuminate the liquid crystal display.

11. The system for back lighting a liquid crystal display according to claim 10, wherein said lamp is tubular.

12. The system for back lighting a liquid crystal display according to claim 10, wherein said light director comprises:
   a light collector, positioned below said bottom surface of said light distributor, for collecting the light generated by said lamp; and
   a faceted reflecting element for reflecting substantially all of the collected light into said light distributor.

13. The system for back lighting a liquid crystal display according to claim 10, wherein said rectangular light distributor has a substantially uniform thickness.

14. The system for back lighting a liquid crystal display according to claim 10, wherein said serration pattern comprises a plurality of linear grooves oriented normal to said major axis of said rectangular light distributor.

15. The system for back lighting a liquid crystal display according to claim 10, wherein said serration pattern comprises a plurality of paired linear grooves oriented at an angle opposite to and bisected by said major axis of said rectangular light distributor.

16. The system for back lighting a liquid crystal display according to claim 10, wherein said serration pattern comprises a plurality of arctuate grooves oriented normal to and bisected by said major axis of said rectangular light distributor.

17. The system for back lighting a liquid crystal display according to claim 10, wherein said pitch gradient increasingly varies a depth of said plurality of grooves continuously from the point proximal to said light collector to the point distal to said light collector.

18. The system for back lighting a liquid crystal display according to claim 10, wherein said pitch gradient varies a depth of said plurality of grooves in a predetermined groups of said grooves from a point proximal to said light collector to a point distal to said light collector.

19. A communication receiver, comprising:
   a receiver for receiving message information including an address;
   a decoder, coupled to said receiver, for decoding the address to detect message information directed to the communication receiver;
   a display for displaying information including the received message information;
   a controller, responsive to said decoder and coupled to said display, for controlling the display of the information including the message information and
   a back lighting system, responsive to information being displayed on said display, comprising
   a lamp, responsive to said controller, for generating light for illumination;
   a light director, optically coupled to said lamp, and further coupled to a light distributor at an edge normal to a major axis thereof, for directing the light received from said lamp into said light distributor, and
   said light distributor comprising a transparent material and having a polished, top surface, and a bottom surface comprising a predetermined serration pattern oriented normal to said major axis of said light distributor,
   said predetermined serration pattern comprising a plurality of grooves having a predetermined pitch gradient corresponding thereto,
   said plurality of grooves further having roughened surfaces for diffusing light impinging thereon toward said polished, planar top surface, and
   whereby the light impinging on said polished, planar top surface at less than a critical angle from said roughened surfaces of said grooves is coupled there through to substantially uniformly illuminate the information including the message information being displayed on said display.

20. The communication receiver according to claim 19, wherein said communication receiver further includes a switch activatable by a user and coupled to said controller, for controlling the illumination provided by said lamp.

* * * * *